United States Patent
Levisse et al.

(10) Patent No.: US 11,352,980 B2
(45) Date of Patent: Jun. 7, 2022

(54) TURBINE ENGINE WITH A CONTRA-ROTATING TURBINE FOR AN AIRCRAFT

(71) Applicant: SAFRAN AIRCRAFT ENGINES, Paris (FR)

(72) Inventors: Paul Ghislain Albert Levisse, Moissy-Cramayel (FR); Olivier Belmonte, Moissy-Cramayel (FR); Yanis Benslama, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 360 days.

(21) Appl. No.: 16/596,609

(22) Filed: Oct. 8, 2019

(65) Prior Publication Data
US 2020/0116104 A1    Apr. 16, 2020

(30) Foreign Application Priority Data

Oct. 10, 2018 (FR) ........................ 1859403

(51) Int. Cl.
*F01D 1/24*     (2006.01)
*F02K 3/072*    (2006.01)
(Continued)

(52) U.S. Cl.
CPC .............. *F02K 3/072* (2013.01); *F01D 1/24* (2013.01); *F02C 3/067* (2013.01); *F02C 7/06* (2013.01);
(Continued)

(58) Field of Classification Search
CPC ... F01D 1/24; F01D 1/26; F02C 3/067; F02K 3/072
See application file for complete search history.

(56) References Cited

U.S. PATENT DOCUMENTS 3,673,802 A * 7/1972 Krebs .................... F02C 3/067
                                                                60/268
7,451,592 B2 * 11/2008 Taylor .................... F01D 1/26
                                                                60/268
(Continued)

FOREIGN PATENT DOCUMENTS

EP    1577491 A1    9/2005
EP    2199568 A2 *  6/2010 ............... F01D 5/03
(Continued)

OTHER PUBLICATIONS

Preliminary Research Report and Written Opinion received for French Application No. 1859403, mailed on Jun. 25, 2019, 9 pages (1 page of French Translation CoverSheet and 8 pages of original document).

*Primary Examiner* — Todd E Manahan
*Assistant Examiner* — Marc J Amar
(74) *Attorney, Agent, or Firm* — Womble Bond Dickinson (US) LLP

(57) ABSTRACT

Turbine engine (10) with a contra-rotating turbine for an aircraft,
the turbine engine comprising a contra-rotating turbine (22) whose first rotor (22a) is configured to rotate in a first direction of rotation and is connected to a first turbine shaft (36), and a second rotor (22b) is configured to rotate in an opposite direction of rotation and is connected to a second turbine shaft (38), the first rotor comprising turbine wheels (36a) inserted between turbine wheels (38a) of the second rotor,
the turbine engine further comprising a mechanical reduction gear (42) with an epicyclic gear train which comprises a sun gear (44) driven in rotation by said second shaft, a ring gear (40) driven in rotation by said first shaft, and a planet carrier (46) fixed to a stator casing (28) of the turbine engine situated downstream (Continued)

from the contra-rotating turbine with respect to direction of flow of the gases in the turbine engine, the turbine engine further comprising a bearing (56) for guiding the second shaft with respect to the first shaft, and a bearing for guiding the second shaft with respect to said stator casing, characterised in that said bearings are all situated downstream from the trailing edge of the last turbine wheel of the contra-rotating turbine and upstream from the reduction gear.

14 Claims, 3 Drawing Sheets

(51) Int. Cl.
*F02C 3/067* (2006.01)
*F02C 7/06* (2006.01)
*F02C 7/36* (2006.01)

(52) U.S. Cl.
CPC ............ *F02C 7/36* (2013.01); *F05D 2250/75* (2013.01); *F05D 2260/40311* (2013.01)

(56) References Cited

U.S. PATENT DOCUMENTS

| | | | |
|---|---|---|---|
| 2009/0151317 A1* | 6/2009 | Norris | F02C 3/107 |
| | | | 415/68 |
| 2012/0000177 A1* | 1/2012 | Vuillemin | F02K 3/072 |
| | | | 60/39.162 |
| 2016/0195019 A1* | 7/2016 | Roberge | F01D 25/162 |
| | | | 60/39.15 |
| 2018/0223732 A1* | 8/2018 | Clements | F02C 3/067 |
| 2018/0355951 A1* | 12/2018 | Stuart | F16H 1/22 |
| 2019/0017382 A1* | 1/2019 | Clements | F02C 3/10 |
| 2019/0085723 A1* | 3/2019 | Pankaj | F02C 3/04 |
| 2019/0085725 A1* | 3/2019 | Zatorski | F02C 3/067 |
| 2020/0003157 A1* | 1/2020 | Clements | F01D 5/225 |

FOREIGN PATENT DOCUMENTS

| | | |
|---|---|---|
| EP | 2199568 A2 | 6/2010 |
| WO | 2015/189524 A1 | 12/2015 |

\* cited by examiner

TURBINE ENGINE WITH A CONTRA-ROTATING TURBINE FOR AN AIRCRAFT

TECHNICAL FIELD

The present invention concerns a turbine engine with a contra-rotating turbine for an aircraft.

STATE OF THE ART

The state of the art comprises documents EP-A2-2 199 568, WO-A1-2015/189524 and EP-A1-1 577 491.

Conventionally, an aircraft turbine engine comprises, from upstream to downstream, in the direction of flow of the gases, a fan, a low-pressure compressor, a high-pressure compressor, an annular combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

From an engine performance and consumption point of view, it is advantageous to maximise the rotation speed of the low-pressure turbine, as this makes it possible to obtain a better efficiency of the turbine. However, increasing the rotation speed of the turbine involves increasing the centrifugal forces that it undergoes, and therefore highly complicates its design.

A suggestion to increase the efficiency of a turbine without increasing its rotation speed consists of using a contra-rotating turbine. The low-pressure turbine is then replaced by a two-rotor turbine whose first turbine is configured to rotate in a first direction of rotation and is connected to a first turbine shaft, and a second rotor is configured to rotate in an opposite direction of rotation and is connected to a second turbine shaft. The first rotor comprises turbine wheel inserted between turbine wheels of the second rotor.

A low-pressure turbine can have a maximum rotation speed of 4,000 rotations per minute in a conventional architecture where the turbine directly drives the fan at 10,000 rotations per minute in an architecture where the turbine drives the fan by way of a reduction gear. Its replacement by a contra-rotating turbine whose rotors rotate respectively at maximum speeds of 3,000 and 7,000 rotations per minute makes it possible to have a relative speed of 10,000 rotations per minute (3,000+7,000) while having an absolute speed in a low range of the abovementioned speed interval.

This contra-rotating turbine thus comprises a slow rotor and a rapid rotor, the slow rotor driving the fan and the rapid rotor meshing with a mechanical reduction gear with an epicyclic gear train.

The reduction gear couples the rapid rotor and the slow rotor, thus making it possible for a transfer of power from the rapid rotor to the slow rotor. Greater efficiencies of a rapid rotor are benefited from, while transferring a large part of the power from the turbine to the fan, without passing through a reduction gear, but via a shaft.

This architecture is complex because of its mechanical integration: the mechanical reduction gear is situated downstream from the turbine engine, radially inside a stator casing called exhaust casing.

In the state of the art, this positioning of the reduction gear involves placing numerous bearings and enclosures for recovering oil inside the exhaust casing. Moreover, the reduction gear is situated in a relatively hot zone, which requires a consequent thermal protection. The space situated inside the exhaust casing is therefore particularly constrained, which involves working to the maximum integration of the reduction gear and reducing its scope of implementation.

Current integration solutions are particularly complex, as there are numerous inter-shaft bearings which are particularly difficult to lubricate. Turbine radial loads are likely to pass into the reduction gear, which is extremely damaging for the reduction gear to perform correctly. Finally, the volume is not optimised, in particular with the presence of bearings under the planet gear or sun gear of the reduction gear, which limits the radial integration of the reduction gear.

SUMMARY OF THE INVENTION

The present invention proposes an improvement to the technology described above, which represents a simple, effective and economic solution to at least some of the problems mentioned above.

The invention proposes a turbine engine with a contra-rotating turbine for an aircraft, the turbine engine comprising a contra-rotating turbine whose first rotor is configured to rotate in a first direction of rotation and is connected to a first turbine shaft, and a second rotor is configured to rotate in an opposite direction of rotation and is connected to a second turbine shaft, the first rotor comprising turbine wheels inserted between turbine wheels of the second rotor, the turbine engine further comprising a mechanical reduction gear with an epicyclic gear train which comprises a sun gear driven in rotation by said second shaft, a ring gear driven in rotation by said first shaft, and a planet carrier fixed to a stator casing of the turbine engine situated downstream from the contra-rotating turbine with respect to a direction of flow of the gases in the turbine engine, the turbine engine further comprising a bearing for guiding the second shaft with respect to the first shaft, and a bearing for guiding the second shaft with respect to said stator casing, characterised in that said bearings are all situated downstream from a trailing edge of the most downstream wheel of the contra-rotating turbine and upstream from the reduction gear.

This solution is advantageous for several reasons. First, from a simplification and mounting standpoint, since the number of bearings is limited and can be of two only, namely one for guiding the second shaft with respect to the first shaft and another for guiding the second shaft with respect to the stator casing. Moreover, from a volume and integration point of view, they are also simplified due to the number and the position of the bearings. These bearings are actually situated in one same zone situated downstream from the contra-rotating turbine and upstream from the reduction gear. They are thus positioned to facilitate the transmission of forces from the first shaft to the stator casing, by avoiding urging the reduction gear. In addition, the reduction gear is mainly connected to three members, only one of which is called "rigid", the two others being called "flexible". Indeed, in the configuration above, due to the position of the bearings and the limitation of their number, the first shaft forms a flexible member connecting to the reduction gear, as is the case of the second shaft. Only the planet carrier, which is connected to the stator casing, can be considered as a rigid member.

The turbine engine according to the invention can comprise one or more of the features below, taken individually from one another or in combination with one another:
- said second shaft is guided by one single bearing with respect to said first shaft, and by one single bearing with respect to said stator casing,
- each bearing is a single bearing or double bearing,
- said second shaft is guided by a ball bearing with respect to said first shaft,
- said ball bearing comprises an outer ring fixed directly to a tubular, cylindrical portion of said second shaft, and
- said ball bearing has an inner ring fixed directly or by way of an annular pedestal with an I-shaped cross-section to a tubular, cylindrical portion of said first shaft,
- said second shaft is guided by a roller bearing with respect to said stator casing,
- said roller bearing comprises an inner ring fixed directly to a tubular, cylindrical portion of said second shaft, and an outer ring fixed by an annular bearing support to said stator casing,
- the turbine engine further comprises a second bearing for guiding the second shaft with respect to the stator casing, said second guiding bearing being situated downstream from a trailing edge of the most downstream wheel of the contra-rotating turbine an upstream from the reduction gear,
- the turbine engine further comprises a bearing for guiding the first shaft with respect to the stator casing, said guiding bearing being situated at the level of the downstream end of said first shaft,
- seals, for example labyrinth seals, are situated upstream from said bearings, on the one hand, between the first and second shafts, and on the other hand, between the second shaft and the stator casing,
- said seals are configured to ensure the sealing of a lubrication enclosure delimited in particular by said first shaft, as well as the planet carrier of said reduction gear, and
- said bearings are at least partially axially interlocked inside one another.

DESCRIPTION OF THE FIGURES

The invention will be best understood and other details, features and advantages of the invention will appear more clearly upon reading the following description made as a non-limiting example and in reference to the appended drawings, wherein.

DETAILED DESCRIPTION

Figure 1:
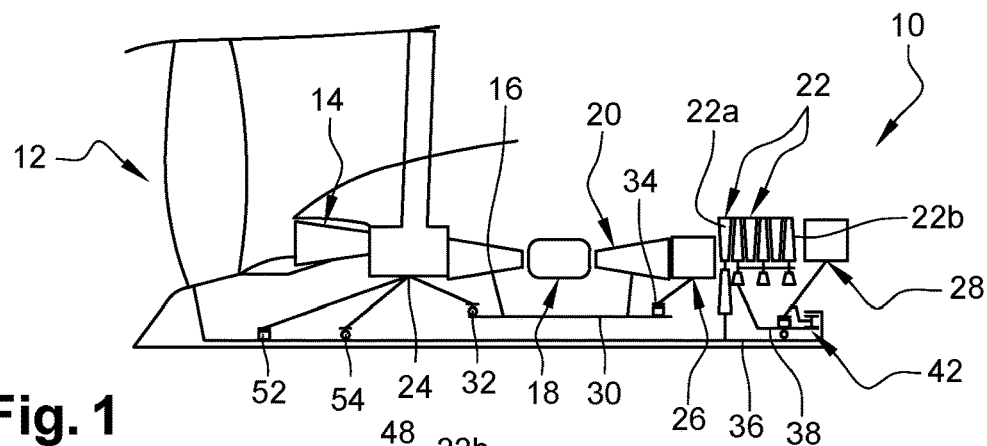
FIG. 1 is a schematic, cross-sectional, axial view of a turbine engine with a contra-rotating turbine according to the invention.

FIG. 1 very schematically represents a turbine engine 10 with a contra-rotating turbine for an aircraft.

This turbine engine 10 comprises, from upstream to downstream, in the direction of flow of the gases, a fan 12, a low-pressure compressor 14, a high-pressure compressor 16, an annular combustion chamber 18, a high-pressure turbine 20 and a contra-rotating turbine 22. A person skilled in the art will appreciate that the term "turbine engine" designates just as well, a turbojet, a turboprop or a turboshaft for which the specific configuration of the different elements can be different.

The reference 24 designates an intermediate casing situated between the compressors 14 and 16, and the reference 26 designates a turbine casing (of the TVF type) situated between the turbines 20 and 22. Finally, the reference 28 designates an exhaust casing (of the TRF type). These casings form the structure of the turbine engine: they support the bearings which guide the shafts in rotation and are connected to the suspensions of the turbine engine.

The rotor of the high-pressure turbine 20 drives in rotation the rotor of the high-pressure compressor 14 by a high-pressure shaft 30 which is centred and guided in rotation by bearings, such as an upstream ball bearing 32 and a downstream roller bearing 34. The bearing 32 is mounted between an upstream end of the shaft 30 and the intermediate casing 24, and the bearing 34 is mounted between a downstream end of the shaft 30 and the turbine casing 26.

Figure 2:
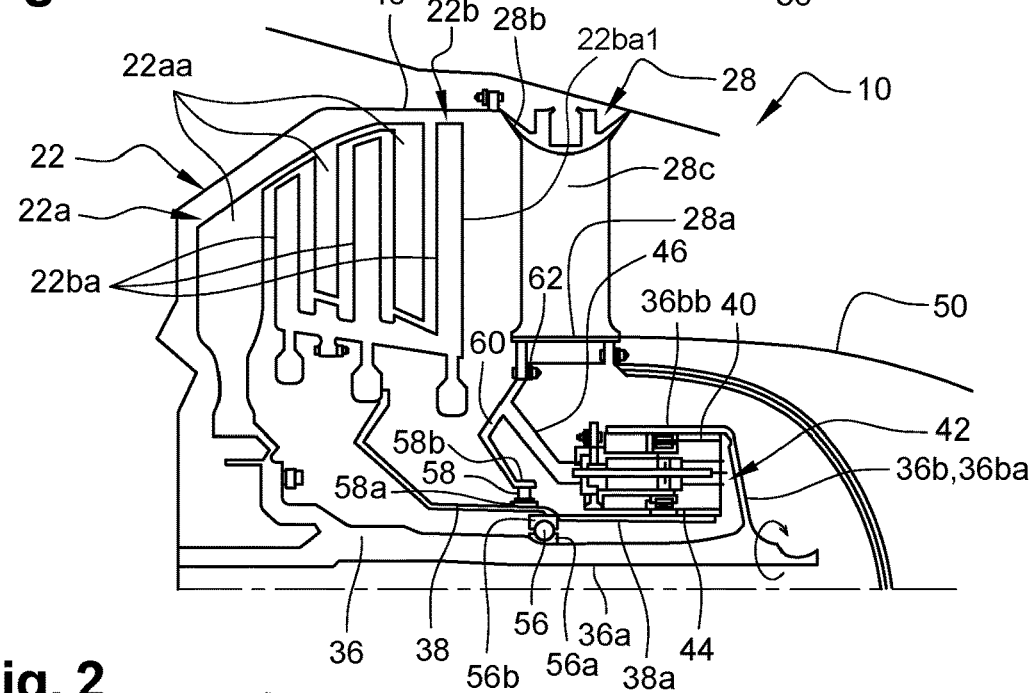
FIG. 2 is a schematic, larger-scale and more detailed view of the downstream portion of the turbine engine of FIG. 1.

The contra-rotating turbine 22 comprises a first rotor 22a of which wheels 22aa are configured to rotate in a first direction of rotation and are connected to a first turbine shaft 36, and a second rotor 22b whose wheels 22ba are configured to rotate in an opposite direction of rotation and are connected to a second turbine shaft 38 and are inserted between the wheels 22aa of the rotor 22a (FIGS. 1 and 2).

Each turbine wheel comprises an annular row of blades which each comprise an aerodynamic profile comprising a lower surface and an upper surface which merge to form a leading edge and a trailing edge of the gases in the turbine duct.

The first shaft 36 drives in rotation the fan 12, as well as the rotor of the low-pressure compressor 14. This first shaft 36 is furthermore meshed with a ring gear 40 of a mechanical reduction gear 42 with an epicyclic gear train, which can be best seen in FIG. 2. For this, the first shaft comprises a tubular, cylindrical portion 36a which extends downwards to the inside of the exhaust casing 28 and which comprises, at its downstream end, an annular ferrule 36b with an L-shaped cross-section. This ferrule 36b comprises an annular wall 36ba extending radially outwards from the downstream end of the portion 36a, and a cylindrical wall 36bb extending axially upwards from the outer periphery of the wall 36ba. The wall 36bb comprises an inner gearing (not visible) meshing with an outer gearing of the ring gear 40 of the reduction gear 42. These gearings can be rectilinear.

The ferrule 36b defines around the portion 36a, an annular space, at least partially housing the reduction gear 42.

The second shaft 38 is meshed with the sun gear 44 of planet gear of the reduction gear 42 and comprises a tubular, cylindrical portion 38a extending around and at a radial distance from the portion 36a of the shaft 36. The downstream end of the portion 38a is engaged in the reduction gear 42 and comprises an outer gearing meshing with an inner gearing of the sun gear 44. These gearings can be rectilinear.

The reduction gear 42 further comprises planets (not visible) meshed respectively with the sun gear 44 and the ring gear 40 and carried by a planet carrier 46 which is fixed to the exhaust casing 28.

The exhaust casing 28 comprises a central hub 28a surrounding at least partially the reduction gear 42, as well as an outer ring 28b which surrounds the hub 28a and which is connected to this one by a series of arms 28c, substantially radial with respect to the longitudinal axis of the turbine engine. The ring 28b is fixed to its upstream end by a flange to a casing 48 extending around the contra-rotating turbine 22, and the hub 28a is fixed to its downstream end to an exhaust funnel 50.

The first shaft 36 is centred and guided upstream by the bearings 52, 54 mounted between the first shaft 36 and the intermediate casing 24. A first of these bearings is, for example, an upstream roller bearing 52, and a second of these bearings is, for example, a downstream ball bearing 54.

The first shaft 36 is furthermore centred and guided downstream by one single bearing 56 which is arranged between the first and second shafts 36, 38 and more precisely between their portions 36a, 38a. In the example represented, this is a ball bearing 56 whose inner ring 56a is fixed directly on the portion 36a and the outer ring 56b is fixed directly on the portion 38a. The bearing 56 is situated downstream from the turbine 22 (i.e. downstream from the trailing edge 22ba1 of the most downstream wheel of the turbine 22) and upstream from the reduction gear 42, and is closer to the upstream end of the exhaust casing 28 than its downstream end.

Figure 4:
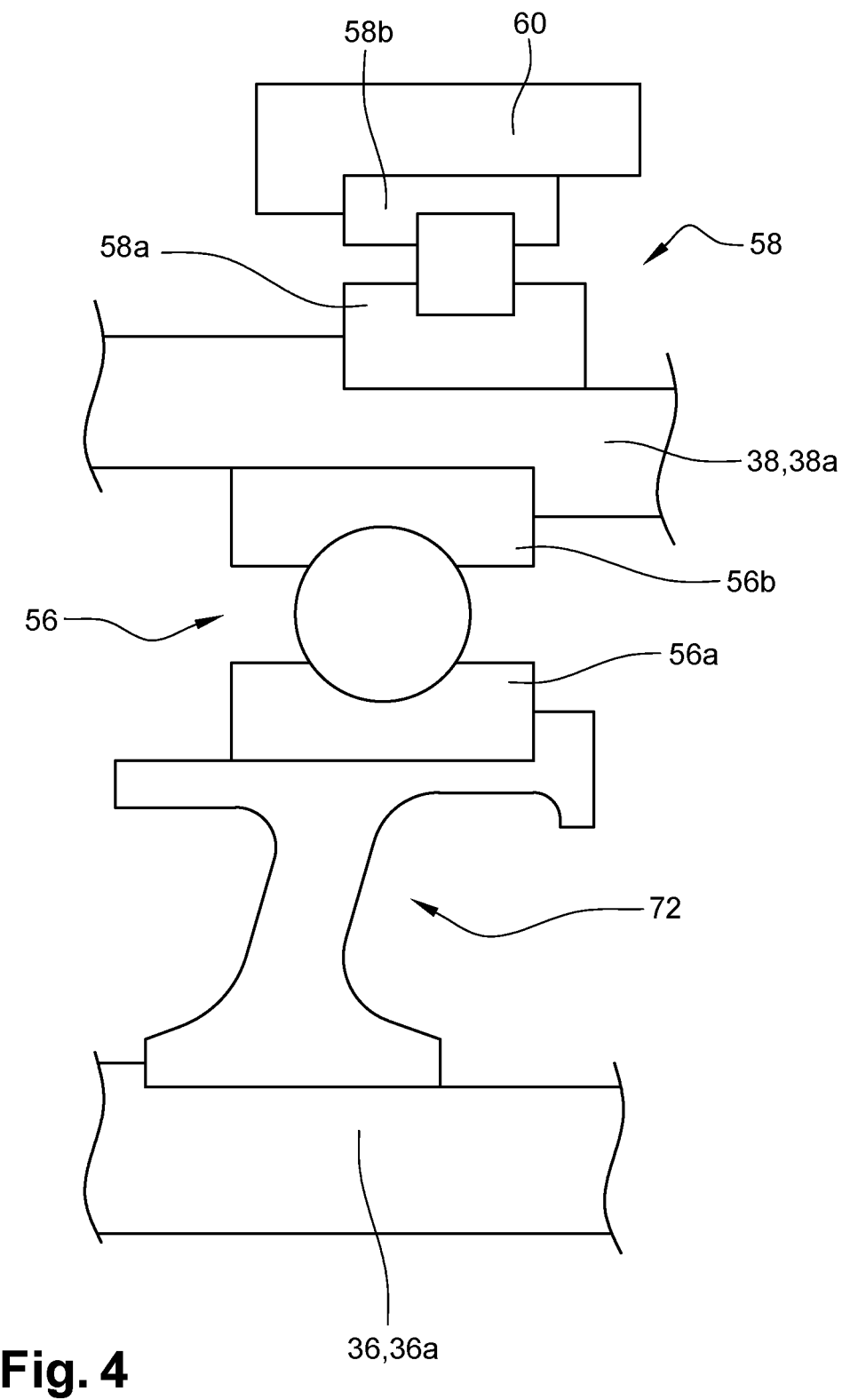
FIG. 4 is a schematic, cross-sectional, axial and also larger-scale view of bearings of an embodiment variant of the turbine engine.

In the variant represented in FIG. 4, the outer ring 56b is fixed directly on the portion 38a and the inner ring 56a is fixed on the portion 36a by way of an annular pedestal 72 with an I-shaped cross-section. This pedestal 72 comprises two coaxial annular walls and extending inside one another, these walls being connected together by a radial annular wall.

In addition to being guided by the bearing 56 opposite the shaft 36, the shaft 38 is also guided by another (single) bearing 58 opposite the exhaust casing 28. In the example represented, this is a roller bearing 58 of whose inner ring 58a is fixed directly on the portion 38a and whose outer ring 58b is fixed to the inner periphery of an annular bearing support 60 whose outer periphery is fixed to the exhaust casing 28 and more specifically, at its upstream end. The bearing 58 is situated downstream from the turbine 22 (i.e. downstream from the trailing edge 22ba1 of the most downstream wheel of the turbine 22) and upstream from the reduction gear 42, and closer to the upstream end of the exhaust casing 28 than its downstream end.

Each bearing ring can be fixed to a shaft or a shaft portion (or a pedestal wall) by tightening this ring against a cylindrical shoulder, this tightening being obtained, for example, by a nut screwed on this shaft or shaft portion (or pedestal wall). The pedestal itself can be fixed in the same manner on a shaft or a shaft portion.

As in the example represented, the bearings 56, 58 can be in the proximity of one another and preferably extend at least partially, one around the other. This makes it possible to avoid a cantilever. The bearing 56 here has a diameter less than that of the bearing 58.

In the example represented, the bearing support 60 and the planet carrier 46 are interconnected or are formed of one single part and are fixed by one same outer annular flange 62 to an upstream annular flange downstream from the exhaust casing 28.

Figure 5:
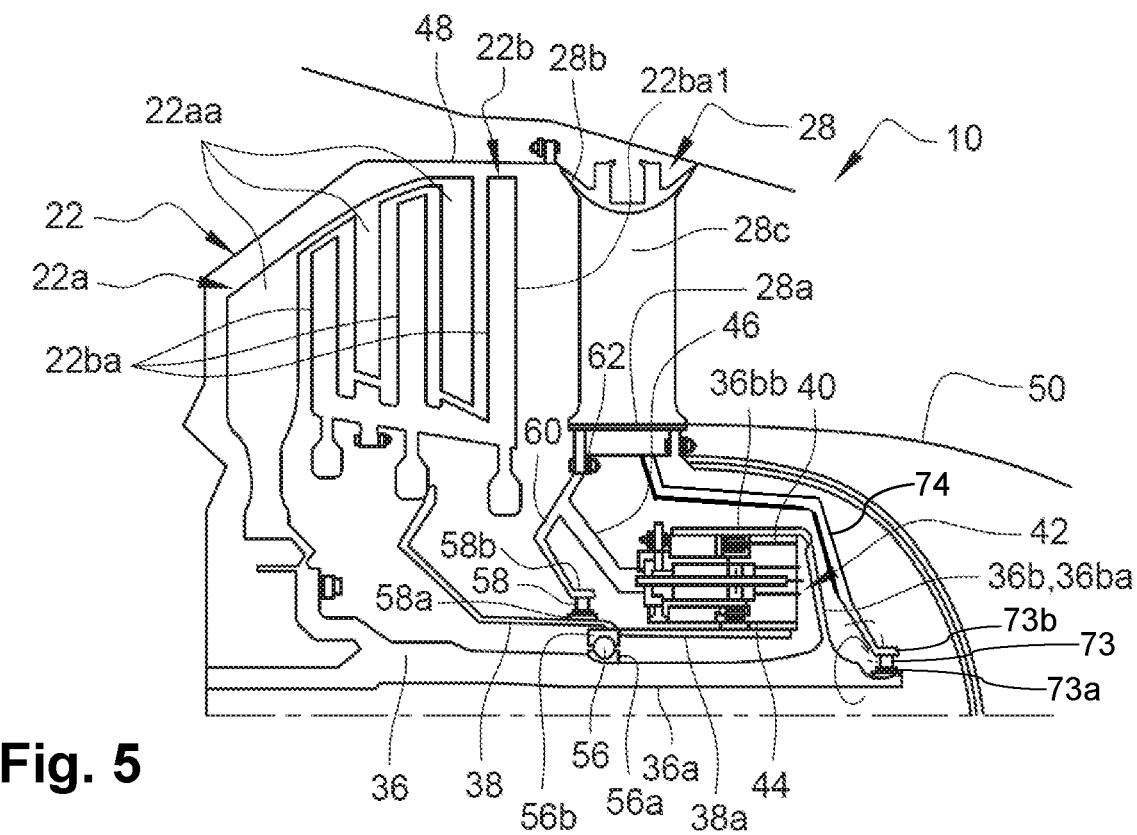
FIG. 5 is a view similar to that of FIG. 2 and illustrating another embodiment of a turbine engine according to the invention.

In the variant represented in FIG. 5, in addition to being guided by the bearing 56 opposite the shaft 38, the shaft 36 is also guided by another bearing 73 opposite the exhaust casing 28. In the example represented, this is a roller bearing 73 of which the inner ring 73a is fixed directly to the first turbine shaft 36 and of which the outer ring 73b is fixed to the inner periphery of an annular bearing support 74 of which the outer periphery is fixed to the exhaust casing 28. The bearing 73 is situated downstream from the reduction gear 42 at the level of the downstream end of the shaft 36. Advantageously, the shaft 36 is thus best maintained.

Figure 6:
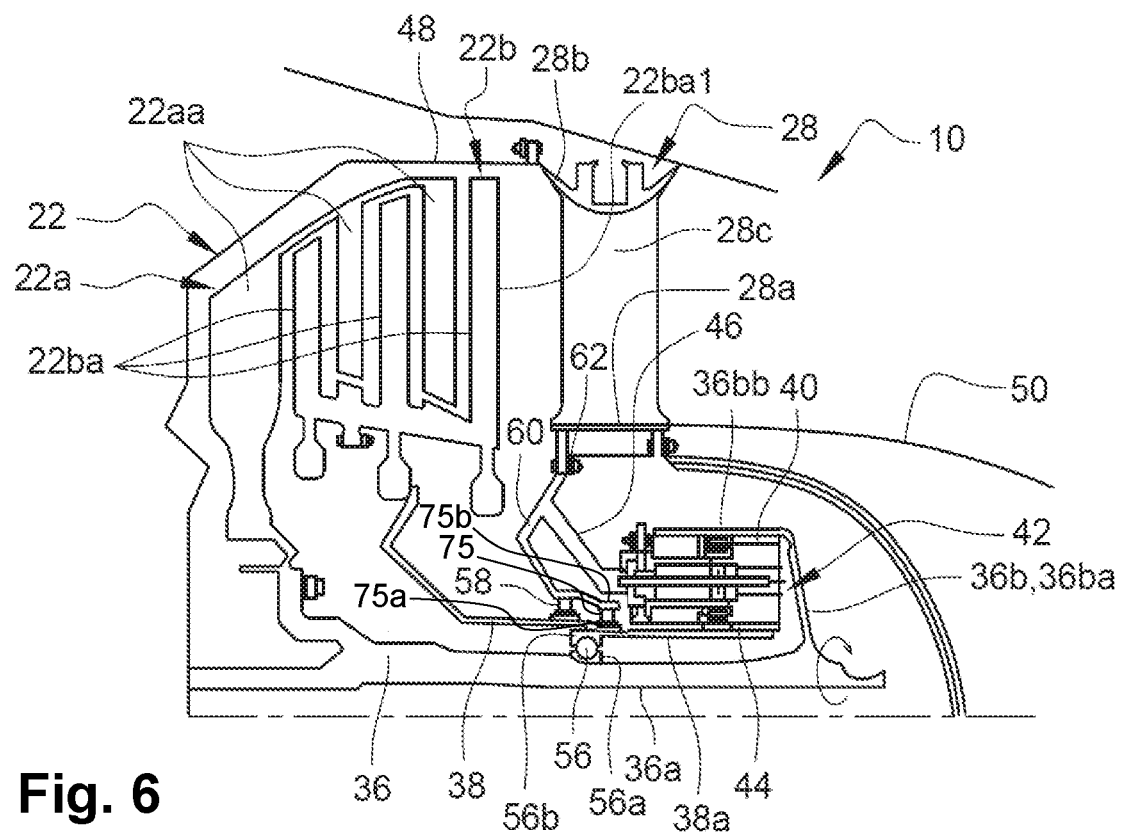
FIG. 6 is a view similar to that of FIG. 2 and illustrating yet another embodiment of a turbine engine according to the invention.

In the variant represented in FIG. 6, in addition to being guided, on the one hand, by the bearing 56 opposite the shaft 36 and, on the other hand, by the bearing 58 opposite the exhaust casing 28, the shaft 38 is also guided by another bearing 75 opposite the exhaust casing 28. In the example represented, this is a roller bearing 75 of which the inner ring 75a is fixed directly on the portion 38a of the shaft 38 and whose outer ring 75b is fixed, like for the bearing 58, at the inner periphery of the annular bearing support 60. The bearing 75 is situated downstream from the bearing 58 and upstream from the reduction gear 42 and thus contributes to reinforcing the balance and the robustness of the connection between the shaft 38 and the exhaust casing 28.

Figure 3:
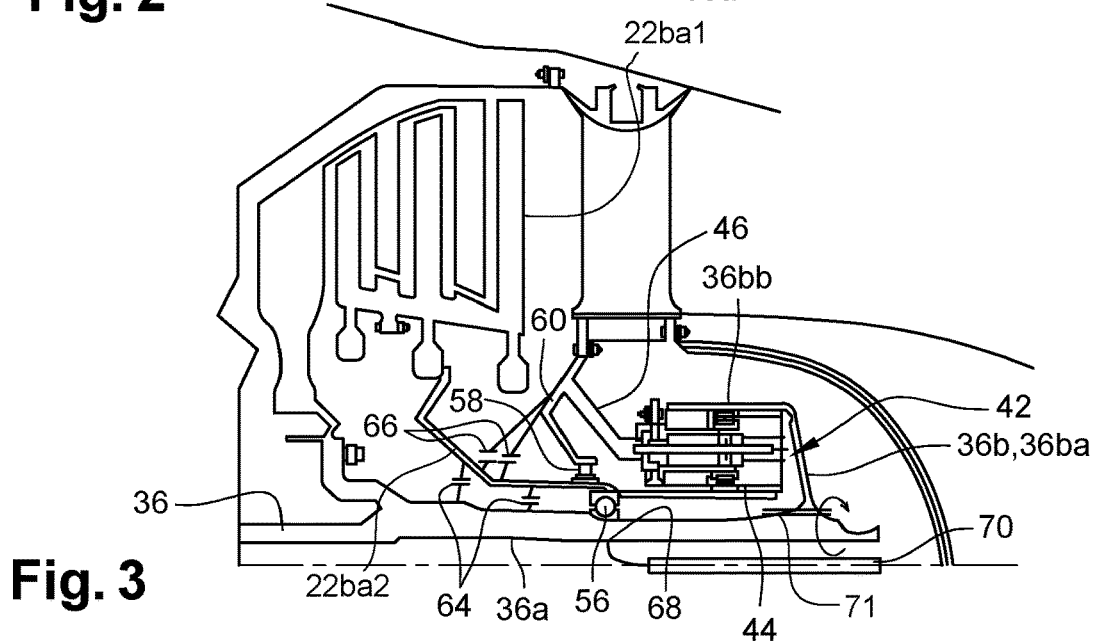
FIG. 3 is a view similar to that of FIG. 2 and illustrating, in addition, seals.

FIG. 3 shows an example of positioning seals 64, 66. The reduction gear 42, as well as the bearings 56, 58 are indeed lubricated by oil and are situated in an annular lubrication enclosure which must be maintained sealed to avoid the oil polluting the remainder of the turbine engine.

The lubrication enclosure extends around the portion 36a and is thus radially delimited inside by this portion 36a. It is delimited downstream by the radial wall 36ba of the ferrule 36b and radially outside by the cylindrical wall 36bb of the ferrule, as well as by the planet carrier 46 and the bearing support 60. Its upstream end is here closed sealed by the seals 64, 66 which are preferably of the labyrinth seal type.

A labyrinth seal comprises two elements extending inside one another, one of these elements carrying an abradable material layer and the other of these elements comprising annular strip seals, likely to engage by friction and abrasion with the abradable layer to limit the radial clearances between the elements.

In the example represented, two seals 64 are arranged between the shafts 36, 38. They are situated upstream from the bearing 56, substantially to the right of the downstream end of the turbine 22. Two seals 66 are arranged between the shaft 38 and the bearing support 60. They are situated upstream from the bearing 58, substantially to the right of the downstream end of the turbine 22. At least some of these seals 64, 66 are downstream from the funnel 22ba2 for connecting the wheels 22ba of the turbine 22 to the shaft 38.

The oil can be brought into the enclosure by through radial orifices 68 provided in the portions 36a, 38a of the shafts 36, 38 in the proximity of the bearings 56, 58. An oil injector 70 can be mounted inside the first shaft 36 so as to spray oil over the inner cylindrical surface of the shaft 36. This oil will interconnect the bearing 56 by passing through the orifices 68 of the portion 36a, and can then interconnect the bearing 56 by passing through the orifices of the portion 38a, simply by the forces of the centrifugal force while functioning. The oil is prevented from exiting the enclosure by the seals 66, 68 and can interconnect the reduction gear 42 downstream, which is moreover lubricated by its own lubrication system (not represented).

Thus, the shaft 38 which can rotate at a speed called rapid, drives the sun gear 44 of the reduction gear and thus provides energy to the first shaft 36, which itself is driven by the turbine 22. The inter-shaft (thrust) bearing 56 makes it possible to minimise the axial clearances between the wheels of the turbine 22, because the two shafts move in the same manner. Controlling radial clearances is carried out by means of the roller bearing 58 which makes it possible to radially block the shaft 38 in order to control the clearances at the outer periphery of the turbine wheels. The bearing 58 makes it possible to ensure that the shaft 38 meshed with the reduction gear 42 remains perfectly straight in order to control to the maximum, the misalignments of the reduction gear.

Moreover, the positioning of the bearings presented here facilitates oil recovery, as the presence of the bearing support 60 can be benefited from to facilitate oil recovery. In addition, the inter-shaft bearing 56 can be lubricated by the inside of the shaft 36 using the injector 70. The reduction gear 42 can be lubricated with the same sprayer as the roller bearing 58, as they are both situated around the shaft 38.

Finally, placing the two bearings 56, 58 substantially in one same transversal plane perpendicular to the axis of the turbine engine makes it possible to maximise the radial housing of the shaft 36 and makes it possible also to release the space under the reduction gear 42. Indeed, the aim of this configuration is to limit the radial volume under the exhaust casing 28 in order to be able to decrease its inner diameter. The inner diameter of the exhaust casing 28 is directly dependent on the outer diameter of the reduction gear 42, itself dependent on the original, inner diameter of the sun gear 44. Consequently, any space which could be gained under the sun gear 44 makes it possible to improve the overall volume of the zone. In this configuration, it can be considered to locally lower the original diameter of the reduction gear 42 by decreasing the outer diameter of the shaft 38 and the diameter of the shaft 36.

FIG. 3 makes it possible to also see a variant wherein the ferrule 36*b* of the shaft 36 is connected to the portion 36*a* by slots 71. The ferrule 36*b* and more precisely its wall 36*ba* comprises, at its inner periphery of the inner rectilinear slots 71 for coupling to outer rectilinear slots 71 provided at the outer periphery and downstream from the portion 36*a* of the shaft 36.

The invention claimed is:

1. A turbine engine with a contra-rotating turbine for an aircraft,
   the turbine engine having a contra-rotating turbine whose first rotor is configured to rotate in a first direction of rotation and is connected to a first turbine shaft, and a second rotor is configured to rotate in an opposite direction of rotation and is connected to a second turbine shaft, the first rotor having turbine wheels inserted between turbine wheels of the second rotor,
   the turbine engine further comprising a mechanical reduction gear with an epicyclic gear train which has a sun gear driven in rotation by said second shaft, a ring gear driven in rotation by said first shaft, and a planet carrier fixed to a stator casing of the turbine engine situated downstream from the contra-rotating turbine with respect to a direction of flow of the gases in the turbine engine,
   the turbine engine having a bearing for guiding the second shaft with respect to the first shaft, and a bearing for guiding the second shaft with respect to said stator casing,
   characterised in that said bearings are all situated downstream from a trailing edge of the most downstream wheel of the contra-rotating turbine and upstream from the reduction gear.

2. The turbine engine according to claim 1, wherein said second shaft is guided by one single bearing with respect to said first shaft, and by one single bearing with respect to said stator casing.

3. The turbine engine according to claim 1, wherein each bearing is a single bearing or double bearing.

4. The turbine engine according to claim 2, wherein said bearing for guiding the second shaft with respect to the first shaft is a ball bearing.

5. The turbine engine according to claim 4, wherein said ball bearing has an outer ring fixed directly to a tubular, cylindrical portion of said second shaft.

6. The turbine engine according to claim 4, wherein said ball bearing has an inner ring fixed directly, or by way of an annular pedestal with an I-shaped cross-section, to a tubular, cylindrical portion of said first shaft.

7. The turbine engine according to claim 1, wherein said bearing for guiding the second shaft with respect to said stator casing is a roller bearing.

8. The turbine engine according to claim 7, wherein said roller bearing has an inner ring fixed directly to a tubular, cylindrical portion of said second shaft, and an outer ring fixed by an annular bearing support to said stator casing.

9. The turbine engine according to claim 1, said turbine engine further comprising a second bearing for guiding the second shaft with respect to the stator casing, said second guiding bearing being situated downstream from a trailing edge of the most downstream wheel of the contra-rotating turbine and upstream from the reduction gear.

10. The turbine engine according to claim 1, said turbine engine further comprising a bearing for guiding the first shaft with respect to the stator casing, said guiding bearing being situated at the level of the downstream end of said first shaft.

11. The turbine engine according to claim 1, wherein seals are situated upstream from said bearings, on the one hand, between the first and second shafts, and on the other hand, between the second shaft and the stator casing.

12. The turbine engine according to claim 11, wherein said seals are labyrinth seals.

13. The turbine engine according to claim 11, wherein said seals are configured to ensure the sealing of a lubrication enclosure delimited in particular by said first shaft, as well as the planet carrier of said reduction gear.

14. The turbine engine according to claim 1, wherein said bearings are at least partially axially interlocked in one another.

* * * * *